P. F. HANSEN.
ATTACHMENT FOR PLANTERS.
APPLICATION FILED JAN. 15, 1912.

1,028,353.

Patented June 4, 1912.

Witnesses:

Inventor,
Peter F. Hansen,
By G. C. Kennedy
Attorney.

UNITED STATES PATENT OFFICE.

PETER F. HANSEN, OF QUASQUETON, IOWA.

ATTACHMENT FOR PLANTERS.

1,028,353.  Specification of Letters Patent.  Patented June 4, 1912.

Application filed January 15, 1912. Serial No. 671,152.

*To all whom it may concern:*

Be it known that I, PETER F. HANSEN, a citizen of the United States of America, and a resident of Quasqueton, Buchanan county, Iowa, have invented certain new and useful Improvements in Attachments for Planters, of which the following is a specification.

Figure 1:
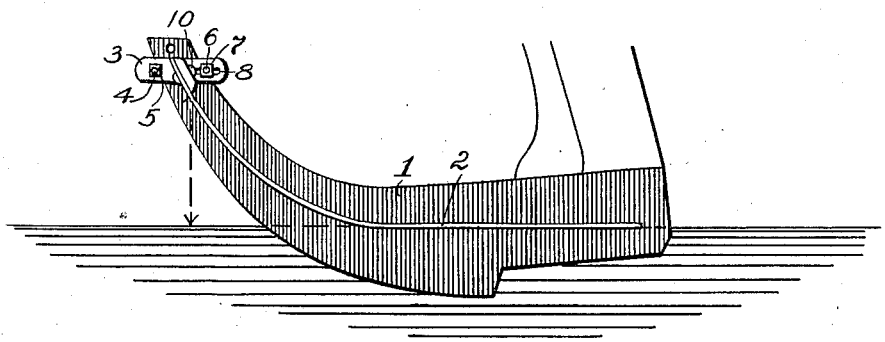
Figure 2:
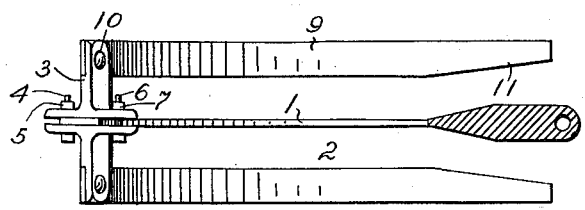

My invention relates to improvements in attachments for planters, and the object of my improvement is to provide for the seeding-shoe of a planter auxiliary adjustable lateral drags or spacers adapted to permit the blade of said shoe to penetrate the earth to a desired adjusted depth, and said device being so formed and arranged as to clear all obstructions and avoid gathering weeds and brush while traveling along the ground. This object I have accomplished by the means which are hereinafter described and claimed, and which are illustrated in the accompanying drawings, in which:

Figure 1 is a side elevation of a planter-shoe equipped with my improved spacing means. Fig. 2 is a plan view of said parts as shown in Fig. 1.

Similar numerals of reference denote corresponding parts throughout the several views.

The planter-shoe 1 is of the ordinary type supported on a depending shank from the superstructure of the planter not shown. The follower or depth spacing runners 2 are located on either side of said shoe 1, spaced apart therefrom, with the inner sides of their rear ends beveled off to secure equal clearance between them and the widened shank in the rear. The forward parts of said runners 2 are curved upwardly with their forward ends secured to a cross-bar 3 by means of bolts 10. The said cross-bar is formed preferably of two like parts each having shanks extending at right angles in opposite directions, and said shanks being orificed in line to permit of the passage therethrough of the securing bolts 4 and 6 on either side, front and back, of the upturned forward part of the shoe 1. The said bolts are secured by nuts 5 and 7 respectively. Since the bolts 4 and 6 are located on opposite sides of the shoe, the runners may be adjusted vertically along the shoe by merely sliding the bolt 6 forward or back in its receiving orifice, the latter being in the form of a slot 8 to permit such adjustment.

It will be seen that the only connection between my runners 2 and the shoe 1 is at the top of the forward part of said shoe, and that the runners are spaced apart from the shoe all around below the cross-bar 3, while the cross-bar 3 is located a considerable distance above the ground, as is indicated by the dotted line in Fig. 1. Since there is always, no matter what the adjustment, so much clearance between said parts and the surface of the ground passed over, weeds, straw, branches and other obstructions are passed over or deflected to one side without collecting upon said parts. Other devices having spacing runners are so closely secured to the shoe and with so little clearance for obstructions of a strawy nature, that they quickly become filled up with a brush of such matters, which effaces the trough of the shoe and nullifies the effect of the shoe on the soil in planting. My device, being provided with so much clearance by reason of its construction and adjustable connection at a certain part of the shoe, will always be free from adherent brushy materials, and thus will be always operative in practice.

Having described my invention, what I claim as new, and desire to secure by Letters Patent, is:

In combination, a planter-shoe, a pair of spacing-runners located on opposite sides of said shoe and spaced apart therefrom throughout, and having their forward ends bent upwardly to conform to the forward curvature of said shoe, cross-connections between the forward ends of said runners and the forward end of said shoe, comprising alined cross-bars secured to said runners and having oppositely-directed projections adapted to contact with opposite sides of the shoe opposite each other, said projections having alined bolt-holes forward of the shoe and alined horizontal slots in the rear of the shoe, and bolts passed through said holes and slots to engage the forward and rear edges of said shoe, with securing-means therefor, said slots permitting vertical adjustment of said runners along said shoe.

Signed at Waterloo, Iowa, this 26th day of Dec. 1911.

PETER F. HANSEN.

Witnesses:
 JOHN F. JOHNSON,
 GEO. C. KENNEDY.

Copies of this patent may be obtained for five cents each, by addressing the "Commissioner of Patents, Washington, D. C."